(12) United States Patent
Schaub et al.

(10) Patent No.: US 12,148,312 B2
(45) Date of Patent: Nov. 19, 2024

(54) SYSTEM AND METHOD FOR DISPLAY OF AIRCRAFT CARBON SAVINGS

(71) Applicant: Rockwell Collins, Inc., Cedar Rapids, IA (US)

(72) Inventors: Steven J. Schaub, Cedar Rapids, IA (US); Eric N. Anderson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 282 days.

(21) Appl. No.: 17/850,404

(22) Filed: Jun. 27, 2022

(65) Prior Publication Data

US 2023/0419842 A1 Dec. 28, 2023

(51) Int. Cl.
*G08G 5/00* (2006.01)
*G06Q 50/26* (2024.01)
*G07C 5/00* (2006.01)
*G07C 5/08* (2006.01)

(52) U.S. Cl.
CPC .......... *G08G 5/0039* (2013.01); *G06Q 50/26* (2013.01); *G07C 5/008* (2013.01); *G07C 5/085* (2013.01)

(58) Field of Classification Search
CPC .. G08G 5/0039; G08G 5/0021; G08G 5/0052; G08G 5/0091; G06Q 50/26; G06Q 10/04; G06Q 10/00; G07C 5/008; G07C 5/085
See application file for complete search history.

(56) References Cited

U.S. PATENT DOCUMENTS

| 7,580,808 | B2 | 8/2009 | Bos |
| 8,427,318 | B2 | 4/2013 | Hamilton et al. |
| 8,730,494 | B2 | 5/2014 | Ishiguro et al. |
| 10,789,854 | B1 * | 9/2020 | Kolesinski ............. G01S 19/51 |
| 2011/0307130 | A1 | 12/2011 | Gow et al. |

(Continued)

FOREIGN PATENT DOCUMENTS

| CA | 2813974 C | 5/2018 |
| CA | 3006525 A1 | 8/2023 |

(Continued)

OTHER PUBLICATIONS

Extended European Search Report dated Nov. 2, 2023; European Application No. 23181853.5.

*Primary Examiner* — Mussa A Shaawat
(74) *Attorney, Agent, or Firm* — Suiter Swantz IP (57) ABSTRACT

A system for displaying carbon savings to a user is disclosed. The system may include one or more carbon savings input devices. The one or more carbon savings input devices may include at least one of a flight management system, a fuel system, an air data system, and an engine control system. The system may include one or more user interface devices including one or more displays. The system may include one or more controllers including one or more processors configured to execute a set of program instructions configured to cause the one or more processors to: receive one or more carbon savings inputs from the carbon savings input devices; calculate a carbon savings value based on the received carbon savings inputs; and generate one or more control signals configured to cause the display of the user interface device to display the calculated carbon savings value to the user.

19 Claims, 8 Drawing Sheets

(56) References Cited

U.S. PATENT DOCUMENTS

| | | | |
|---|---|---|---|
| 2012/0173293 A1 | 7/2012 | Motley et al. | |
| 2017/0197727 A1* | 7/2017 | Kim | G07C 5/0808 |
| 2018/0060204 A1* | 3/2018 | Jin | G06Q 50/26 |
| 2019/0035178 A1* | 1/2019 | Kim | G08G 5/0013 |
| 2019/0137326 A1* | 5/2019 | Suddreth | G01H 17/00 |
| 2020/0200649 A1 | 6/2020 | Ammoura et al. | |
| 2021/0383486 A1 | 12/2021 | Robinson | |
| 2022/0107193 A1 | 4/2022 | Mehra et al. | |
| 2022/0114562 A1* | 4/2022 | Oliver Gomila | G06Q 50/26 |
| 2022/0187089 A1* | 6/2022 | Leung | G01C 21/3469 |
| 2023/0020417 A1* | 1/2023 | Elbsat | G06Q 10/06313 |
| 2023/0289911 A1* | 9/2023 | Freier | G06Q 10/06393 |
| 2023/0326354 A1* | 10/2023 | Durant | G01W 1/02 |
| | | | 701/3 |
| 2024/0013165 A1* | 1/2024 | Karathur | G06Q 10/063 |

FOREIGN PATENT DOCUMENTS

| | | |
|---|---|---|
| CN | 203366310 U | 12/2013 |
| CN | 109720588 A | 5/2019 |
| EP | 3193268 A1 | 11/2018 |
| EP | 3819894 A1 | 5/2021 |
| WO | 2020065675 A1 | 4/2020 |

\* cited by examiner

| Fuel Use Predicted | Actual Fuel Usage | Fuel Savings |
|---|---|---|
| 14000 | 13568 | 432 |

Carbon Reduction

FIG.4I

490  Number of Trees Saved

SYSTEM AND METHOD FOR DISPLAY OF AIRCRAFT CARBON SAVINGS

BACKGROUND

Carbon footprint and sustainability are a growing concern in aviation, with major initiatives underway to develop greener airplanes, fuels, and operating procedures.

SUMMARY

A system for displaying carbon savings to a user is disclosed, in accordance with one or more embodiments of the present disclosure. The system includes one or more carbon savings input devices, the one or more carbon savings input devices including at least one of a flight management system configured to provide flight management system data, a fuel system configured to provide fuel system data, an air data system configured to provide air data system data, and an engine control system configured to provide engine control system data. The system includes one or more user interface devices including one or more displays. The system includes one or more controllers including one or more processors configured to execute a set of program instructions stored in a memory, the set of program instructions configured to cause the one or more processors to: receive one or more carbon savings inputs from the one or more carbon savings input devices; calculate a carbon savings value based on the received one or more carbon savings inputs; and generate one or more control signals configured to cause the one or more displays of the one or more user interface devices to display the calculated carbon savings value to the user.

In some embodiments, the one or more user interface devices may include one or more flight deck devices.

In some embodiments, the one or more user interface devices may include one or more IFE devices.

In some embodiments, the one or more carbon savings input devices may further include at least one of: the display of the one or more user interface devices, a flight control system, or an on-board maintenance system.

In some embodiments, the controller may be further configured to provide the calculated carbon savings value to one or more off-board controllers.

In some embodiments, the one or more off-board controllers may include one or more airline operator control controllers.

In some embodiments, the flight management system data may include at least one of: current flight plan data, alternate flight plan data, or current optimization setting data.

In some embodiments, the fuel system data may include at least one of: fuel mix data, fuel temperature data, or fuel consumption rate data.

In some embodiments, the air data system data may include at least one of: airspeed, air temperature, or air pressure.

In some embodiments, the engine control system data may include at least one of: fuel consumption, engine temperature, engine pressure, or engine speed.

A method for displaying carbon savings to a user is disclosed, in accordance with one or more embodiments of the present disclosure. The method includes receiving one or more carbon savings inputs from one or more carbon savings input devices, the one or more carbon savings input devices including at least one of a flight management system, a fuel system, an air data system, and an engine control system. The method includes calculating a carbon savings value based on the received one or more carbon savings inputs. The method includes generating one or more control signals configured to cause one or more displays of one or more user interface devices to display the calculated carbon savings value to the user.

In some embodiments, the one or more user interface devices may include one or more flight deck devices.

In some embodiments, the one or more user interface devices may include one or more IFE devices.

In some embodiments, the one or more carbon savings input devices may further include at least one of: the display of the one or more user interface devices, a flight control system, or an on-board maintenance system.

In some embodiments, the method may further comprise providing the calculated carbon savings value to one or more off-board controllers.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Carbon footprint and sustainability are a growing concern in aviation, with major initiatives underway to develop greener airplanes, fuels and operating procedures. While airlines and operators have a macro view of the impacts of their flight/aircraft choices, the flight crew has no immediate feedback or insight into the impacts of the operational decisions they make during a flight. For example, the Flight Management System (FMS) currently is able to display various times of arrivals for various entered flight plans, however, the FMS does not display how an alternate flight plan may impact sustainability/carbon footprint.

As such, it would be desirable to provide system and method for display of carbon savings configured to address one or more shortcomings of the previous approaches. The system and method should provide passengers with carbon savings information corresponding to a particular flight session. The system and method should provide flight crew with carbon savings information to allow the flight crew to weigh sustainability in their flight decisions (e.g., fuel choices, weather diversion choices, descent profile choices, and the like).

FIGS. 1-5 in general illustrate a system and method for display of carbon savings, in accordance with one or more embodiments of the disclosure.

Figure 1:
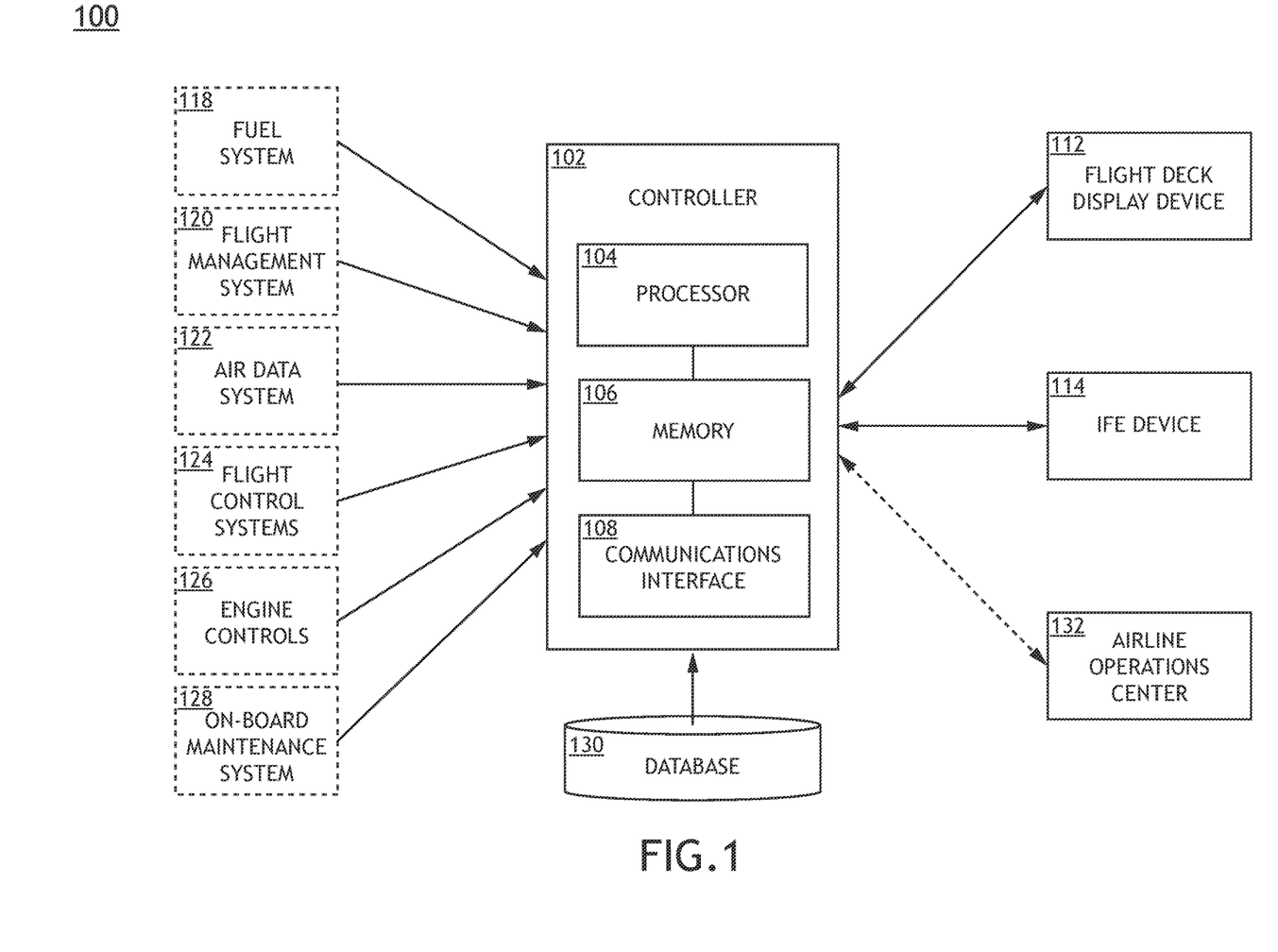
FIG. 1 illustrates a simplified block diagram of a system for display of carbon savings, in accordance with one or more embodiments of the present disclosure.
Figure 2:
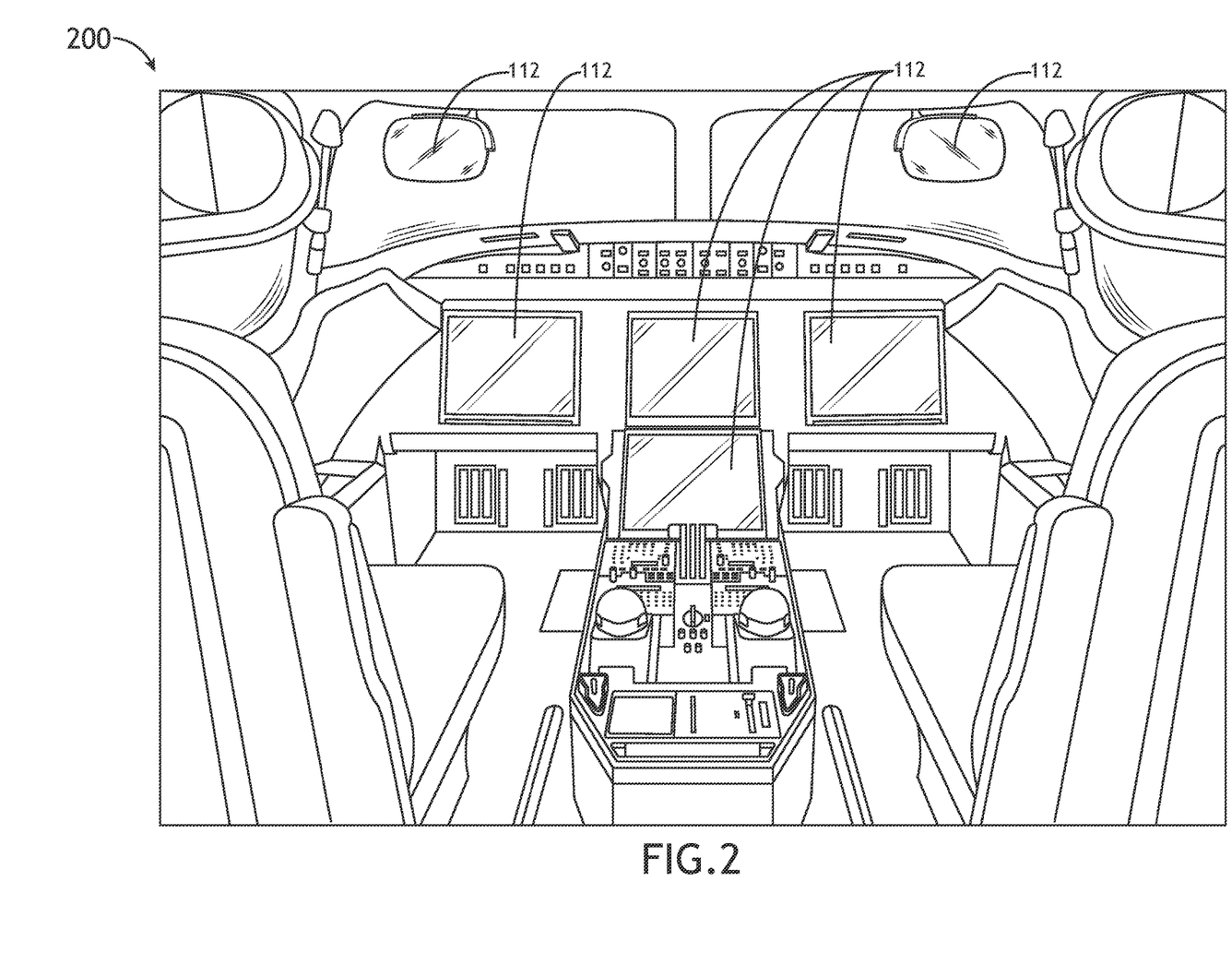
FIG. 2 illustrates a simplified schematic of an aircraft cockpit including the system for display of carbon savings, in accordance with one or more embodiments of the present disclosure.
Figure 3:
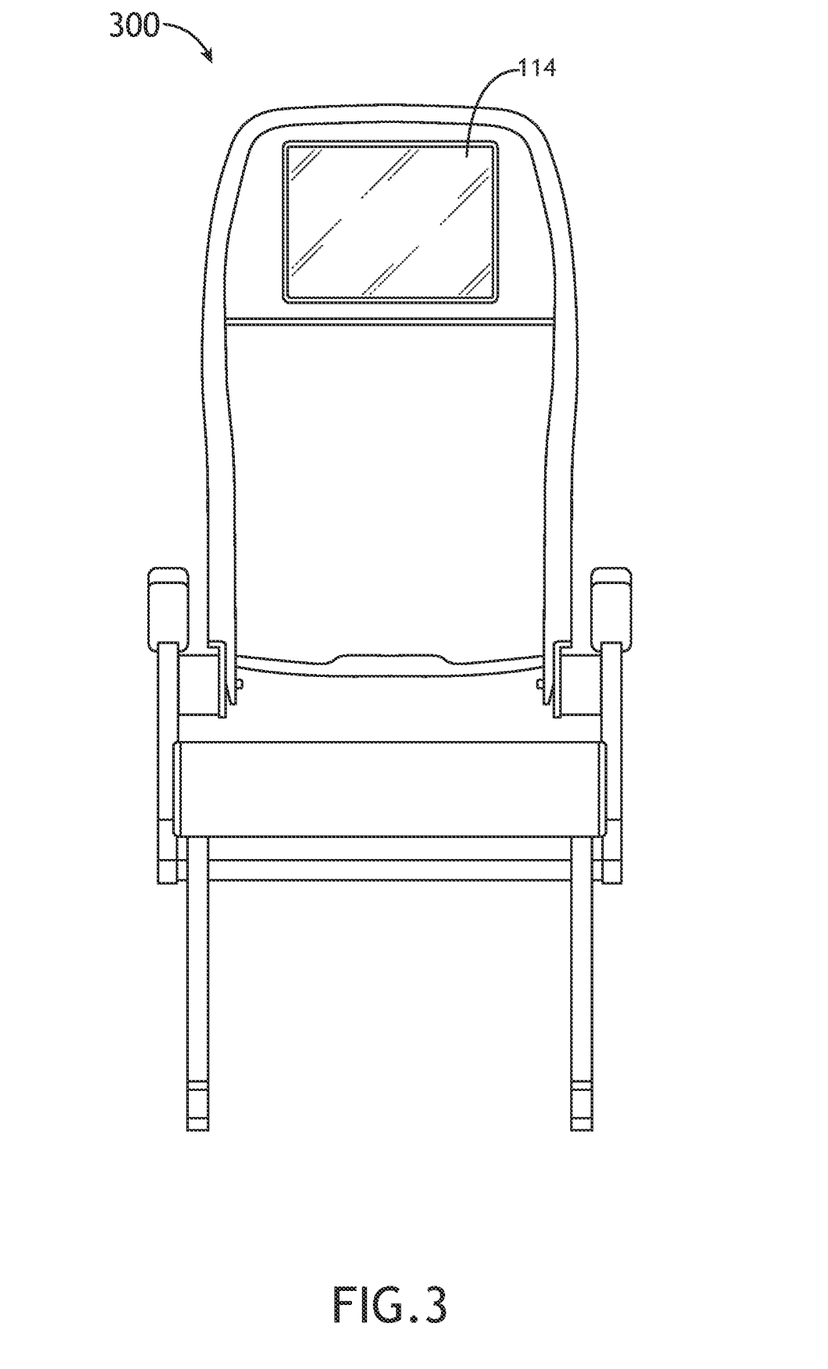
FIG. 3 illustrates a simplified schematic of an aircraft seat including the system for display of carbon savings, in accordance with one or more embodiments of the present disclosure.

FIG. 1 illustrates a simplified block diagram of a system for displaying carbon savings, in accordance with one or more embodiments of the present disclosure. FIG. 2 illustrates an aircraft cockpit including the system for displaying carbon savings, in accordance with one or more embodiments of the present disclosure. FIG. 3 illustrates an in-flight entertainment (IFE) device of an aircraft including the system for displaying carbon savings, in accordance with one or more embodiments of the present disclosure.

Referring now to FIG. 1, the system 100 may include an aircraft controller 102. The aircraft controller 102 may include one or more processors 104, memory 106 configured to store one or more program instructions, and/or one or more communication interfaces 110.

In some embodiments, as shown in FIG. 2, the system 100 may include an avionics environment 200 such as, but not limited to, a cockpit, or the like. The aircraft controller 102 may be coupled (e.g., physically, electrically, and/or communicatively) to one or more flight deck display devices 112. As discussed further herein, the one or more flight deck display devices 112 may be configured to display two-dimensional images and/or three-dimensional images. The avionics environment (e.g., the cockpit) may include any number of flight crew display devices 112 (e.g., one, two, three, or more displays) such as, but not limited to, one or more primary flight displays (PFDs) 112, one or more head-down displays (HDDs) 112, one or more head-up displays (HUDs) 112, one or more multi-function displays (MFDs), one or more adaptive flight displays (AFDs) 112, or the like.

In some embodiments, as shown in FIG. 3, the system 100 may include an avionics environment 300 such as, but not limited to, a passenger compartment/suite, aircraft cabin, or the like. The aircraft controller 102 may be coupled (e.g., physically, electrically, and/or communicatively) to one or more in-flight entertainment (IFE) devices 114. As discussed further herein, the one or more IFE devices 114 may be configured to display two-dimensional images and/or three-dimensional images.

Referring again to FIG. 1, the aircraft controller 102 may be coupled (e.g., physically, electrically, and/or communicatively) to the flight deck display device 112. For example, the aircraft controller 102 may be configured to receive data from the flight display device 112. The flight deck display device 112 (or the IFE device 114) may be coupled to the one or more user input devices. For example, the display device 112 may be coupled to the one or more user input devices by a transmission medium that may include wireline and/or wireless portions. The display device 112 may include and/or be configured to interact with one or more user input devices.

The display device 112 and the one or more user input devices may be standalone components within the aircraft. It is noted herein, however, that the display device 112 and the one or more user input devices may be integrated within one or more common user interfaces.

Where the display device 112 and the one or more user input devices are housed within the one or more common user interfaces, the aircraft controller 102, one or more offboard controllers, and/or the one or more common user interfaces may be standalone components. It is noted herein, however, that the aircraft controller 102, the one or more offboard controllers, and/or the one or more common user interfaces may be integrated within one or more common housings or chassis.

The aircraft controller 102 may be coupled (e.g., physically, electrically, and/or communicatively) to the IFE display device 114. For example, the aircraft controller 102 may be configured to receive data from the IFE display device 114.

The aircraft controller 102 may be coupled (e.g., physically, electrically, and/or communicatively) to and configured to receive data from one or more fuel systems 118. For example, the aircraft controller 102 may be configured to receive fuel consumption data from the one or more fuel systems 118. The fuel data may include, but is not limited to, fuel type, amount of fuel, fuel mix, fuel temperature, fuel consumption rate (total or by engine), and the like.

The aircraft controller 102 may be coupled (e.g., physically, electrically, and/or communicatively) to and configured to receive data from one or more flight management systems (FMSs) 120. For example, the aircraft controller 102 may be configured to receive FMS data from the one or more FMSs 120. The FMS data may include, but is not limited to, flight plan data, alternative flight plan data, current cost optimization settings (e.g., prioritize time or fuel burn), predictive time of arrivals at future way points (which allows the system to forecast carbon usage), and the like.

The one or more flight management systems 120 may include one or more navigational systems. The one or more navigational systems may be coupled (e.g., physically, electrically, and/or communicatively) to and in communication with one or more GPS satellites, which may provide vehicular location data (e.g., aircraft location data) to one or more components/systems of the aircraft. For example, the one or more navigational systems may be implemented as a global navigation satellite system (GNSS) device, and the one or more GPS satellites may be implemented as GNSS satellites. The one or more navigational systems may include a GPS receiver and a processor. For example, the one or more navigational systems may receive or calculate location data from a sufficient number (e.g., at least four) of GPS satellites in view of the aircraft such that a GPS solution may be calculated.

It is noted herein the one or more aircraft sensors may operate as a navigation device, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors may provide aircraft location data and aircraft orientation data, respectively, to the one or more processors 104.

The aircraft controller 102 may be coupled (e.g., physically, electrically, and/or communicatively) to and configured to receive data from one or more air data systems 122. The one or more air data systems 122 may include one or more air data sensors configured to sense a particular condition(s) external to the aircraft. The one or more air data sensors may be configured to output data associated with particular sensed condition(s) to one or more components/systems onboard the aircraft. Generally, the one or more air data sensors may include, but are not limited to, one or more airspeed sensors, one or more air temperature sensors, one or more air pressure sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more weather radar sensors. The one or more weather radar sensors may be configured to provide weather radar data to the controller 102, such that the controller 102 may use such data when calculating carbon savings value(s).

The aircraft controller 102 may be coupled (e.g., physically, electrically, and/or communicatively) to and configured to receive data from one or more flight control systems 124. The flight control system data may include, but is not limited to, flight control surface positions, operating flight control modes (both manual flight and auto flight), position, velocity, time, and the like.

The aircraft controller 102 may be coupled (e.g., physically, electrically, and/or communicatively) to and configured to receive data from one or more engine control systems 126. The engine control system data may include, but is not limited to, fuel consumption, temperatures, pressures and speed of engine sections, and the like. It is noted that the engine control system data may be used to assess how efficiently the fuel is being burned.

The aircraft controller 102 may be coupled (e.g., physically, electrically, and/or communicatively) to and configured to receive data from one or more on-board maintenance systems 128. The on-board maintenance system data may include data regarding the health/operating capabilities of the aircraft systems that may impact efficiency and fuel consumption. For example, the data may include, but is not limited to, status of pumps, valve health/operating data, generator health/operating data, ice protection system health/operating data, braking system health/operating data, and the like.

The aircraft controller 102 may be coupled (e.g., physically, electrically, and/or communicatively) to and configured to receive data from one or more databases 130. For example, the one or more databases 130 may include reference data to support display and comparisons of carbon usage (as discussed further herein with respect to FIGS. 4A-4J. For instance, the reference data may include, but is not limited to, information specific to an aircraft (e.g., engine type, operating efficiencies, and the like). By way of another example, the database may include comparison data. For instance, the comparison data may include, but is not limited to, what the per person carbon impact of driving a single passenger car would be, the nominal carbon impact of non-Sustainable Aviation Fuel would be, or in the case of an electric or hydrogen powered plane, what the impact of a traditionally fueled plane would be.

The aircraft controller 102 may be coupled (e.g., physically, electrically, and/or communicatively) to one or more off-board controllers 132. For example, the one or more off-board controllers 132 may include one or more airline operator control controllers 132. For instance, as discussed further herein, the one or more off-board controllers 132 may be configured to receive data from the aircraft controller 102. In this regard, the aircraft controller 102, via the communication interface 108, may be configured provide the calculated carbon savings value, predicted carbon use, total carbon use, and the like to the off-board controller 132.

The one or more processors 104 may include any one or more processing elements, micro-controllers, circuitry, field programmable gate array (FPGA) or other processing systems, and resident or external memory for storing data, executable code, and other information accessed or generated by the aircraft controller 102. In this sense, the one or more processors 104 may include any microprocessor device configured to execute algorithms and/or program instructions. It is noted herein, however, that the one or more processors 104 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106 may include any storage medium known in the art suitable for storing the set of program instructions executable by the associated one or more processors. For example, the memory 106 may include a non-transitory memory medium. For instance, the memory 106 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106 may be configured to provide display information to the display devices (e.g., the one or more display devices 112, 114). In addition, the memory 106 may be configured to store user input information from a user input device of a user interface. The memory 106 may be housed in a common controller housing with the one or more processors. The memory 106 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 may be configured to perform one or more process steps, as defined by the one or more sets of program instructions. The one or more process steps may be performed iteratively, concurrently, and/or sequentially. The one or more sets of program instructions may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110 may be operatively configured to communicate with one or more components of the aircraft controller 102 and/or the one or more offboard controllers 132. For example, the one or more communication interfaces 110 may also be coupled (e.g., physically, electrically, and/or communicatively) with the one or more processors 104 to facilitate data transfer between components of the one or more components of the aircraft controller 102 and/or the one or more offboard controllers 132 and the one or more processors 104. For instance, the one or more communication interfaces 110 may be configured to retrieve data from the one or more processors 104, or other devices, transmit data for storage in the memory 106, 128, retrieve data from storage in the memory 106 or the like. By way of another example, the aircraft controller 102 and/or the one or more offboard controllers 132 may be configured to receive and/or acquire data or information from other systems or tools by a transmission medium that may include wireline and/or wireless portions. By way of another example, the aircraft controller 102 and/or the one or more offboard controllers 132 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 132 and the other subsystems (e.g., of the aircraft 100 and/or the system 140). In addition, the aircraft controller 102 and/or the one or more offboard controllers 132 may be configured to send data to external systems via a transmission medium (e.g., network connection).

The one or more display devices 112, 114 may include any display device known in the art. For example, the display devices 112, 114 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a digital light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 5:
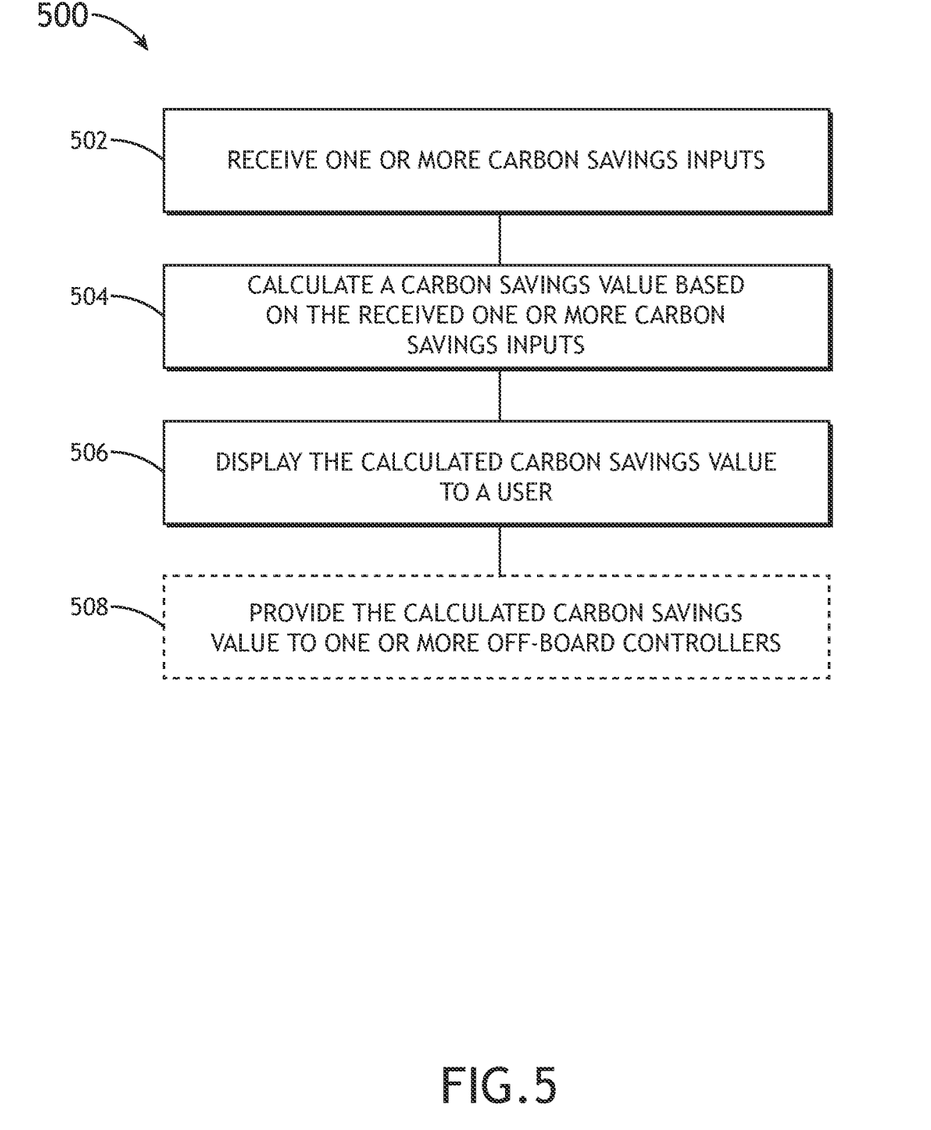
FIG. 5 illustrates a flowchart depicting a method or process for displaying carbon savings, in accordance with one or more embodiments of the present disclosure.

FIG. 5 illustrates a flowchart depicting a method or process 500 for displaying carbon savings, in accordance with one or more embodiments of the present disclosure.

In a step 502, one or more carbon savings inputs may be received. For example, the one or more controllers 102 may be configured to receive one or more carbon savings inputs from one or more components on the aircraft. The one or more carbon savings inputs may include one or more inputs from at least one of the display system, fuel system, flight management system (FMS), air data systems, flight control systems, engine controls, onboard management systems, one or more remote/on-board databases, or the like.

For instance, the one or more controllers 102 may be configured to receive fuel tabular data from the one or more databases 130. The fuel tabular data may include data indicating what the carbon footprint is for a certain type of avionics fuel.

In a step 504, a carbon savings value may be calculated. The calculated carbon savings value may be a real-time carbon savings value based on real-time carbon savings inputs or a predicted carbon savings value. For example, the one or more controllers 102 may be configured to calculate a real-time carbon savings value based on the received one or more carbon savings inputs. By way of another example, the one or more controllers 102 may be configured to calculate a predicted carbon savings value based on the received one or more carbon savings inputs. In this regard, a user may be able view the predicted carbon savings value to make a decision.

It is noted that the controller 102 may be configured to calculate the carbon savings value based on first principles of physical (e.g., based on the physics of burning fuel), approximated by a look-up table, or using a carbon savings valuation model/algorithm. In one instance, the carbon savings value may be calculated based on the received fuel tabular data from the one or more databases 130. In this regard, the calculated carbon savings value may be based on what type of fuel the aircraft used.

In a step 506, the calculated carbon savings value may be displayed to a user. For example, the one or more controllers 102 may be configured to generate one or more control signals configured to cause a display of a user device (e.g., display device 112 of the cockpit, display device 114 of the IFE device, or the like) to display the calculated carbon savings value.

In one instance, as shown in FIG. 2, the display of the flight deck display device 112 may be configured to display the calculated carbon savings value, such that the flight crew may be able to weigh sustainability into their decisions based on a preview of the impact of their flight/choices. In this regard, the flight crew (e.g., pilot) may be able to determine when to start their descent based on the calculated carbon savings value (e.g., if you start descending at a certain point in time then you may save a certain amount of carbon). Further, the flight crew (e.g., pilot) may be able to determine whether an alternate flight path (previously entered into the FMS system) may be more sustainable than the current flight path, such that it would be advantageous (from a sustainability perspective) to edit the route. Further, the flight crew (e.g., pilot) may be able to determine how to approach a weather diversion based on the calculated carbon savings values (e.g., would it be advantageous to go around the storm or go above the storm?). Further, the flight crew (e.g., pilot) may be able to determine whether it would be advantageous (from a sustainability perspective) to change the configuration of the aircraft to increase carbon savings (e.g., when to deploy flaps/gears, aircraft speed, and the like).

In another instance, as shown in FIG. 3, the display of the IFE device 114 may be configured to display the calculated carbon savings value, such that airline/operator may market the carbon savings to their passengers during/after flight.

FIGS. 4A-4J illustrate various graphics corresponding to the calculated carbon savings value, in accordance with one or more embodiments of the present disclosure.

Figure 4A:
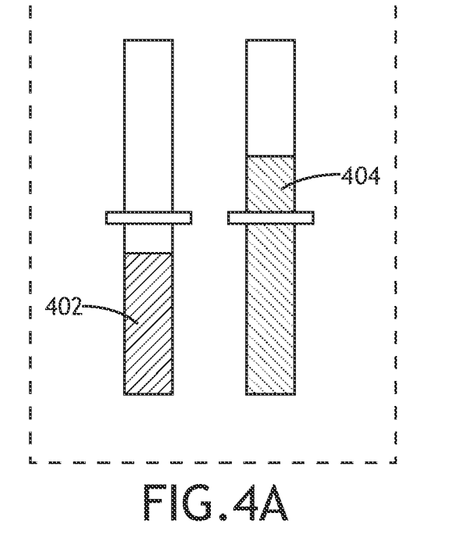
FIG. 4A-4J illustrate example displays depicting an amount of carbon savings for the system, in accordance with one or more embodiments of the present disclosure.
Figure 4B:
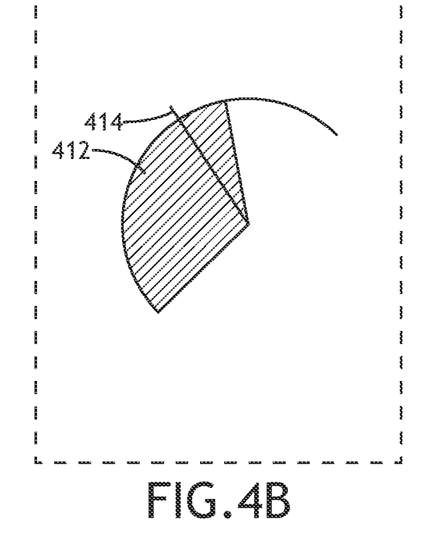

Referring to FIGS. 4A-4B, an instantaneous comparison to nominal may be displayed. For example, as shown in FIG. 4A, the display 400 may include a bar graph including an instantaneous carbon savings value 402 and a nominal value 404. By way of another example, as shown in FIG. 4B, the display 410 may include a pie chart including an instantaneous carbon savings value 412 and a nominal value 414.

In this regard, data from the database 130 may be used. For instance, the historical data may be nominal and so any instantaneous information (derived from the currently occurring flight conditions/data inputs) can be displayed as a relative offset from the nominal (historical) case. For example, if nominal engine cruise settings are being used but the ground speed is 20% higher on this flight (due to winds, better cruise altitude etc.) the system may be configured to display an instantaneous 20% improvement in carbon generation, assuming all other system inputs are equivalent (e.g., same fuel flows, same engine performance/temperatures/pressures, and the like).

Figure 4C:
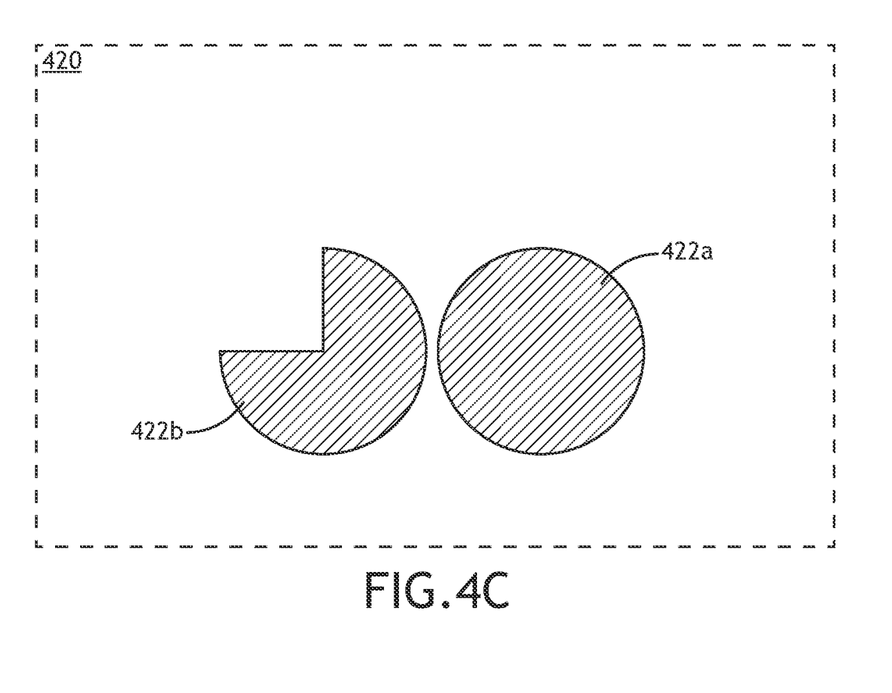

Referring to FIG. 4C, the display 420 may include badges 422 based on quantifiable units of reduced emissions. For example, as shown in FIG. 5A, each badge 422a-422b may correspond to a predetermined amount of carbon dioxide reduction. For instance, as shown in FIG. 5A, each badge 422a-422b may correspond to 50 tons of carbon dioxide reduction. In this regard, a first badge 422a may include 50 tons of carbon dioxide reduction and a second badge 422b may include 37.5 tons of carbon dioxide reduction.

Figure 4D:
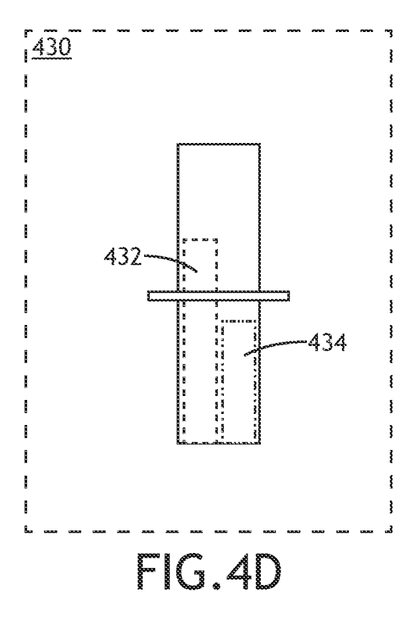
Figure 4E:
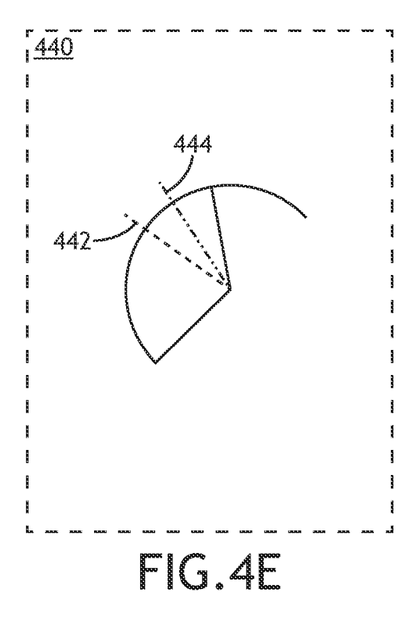
Figure 4F:
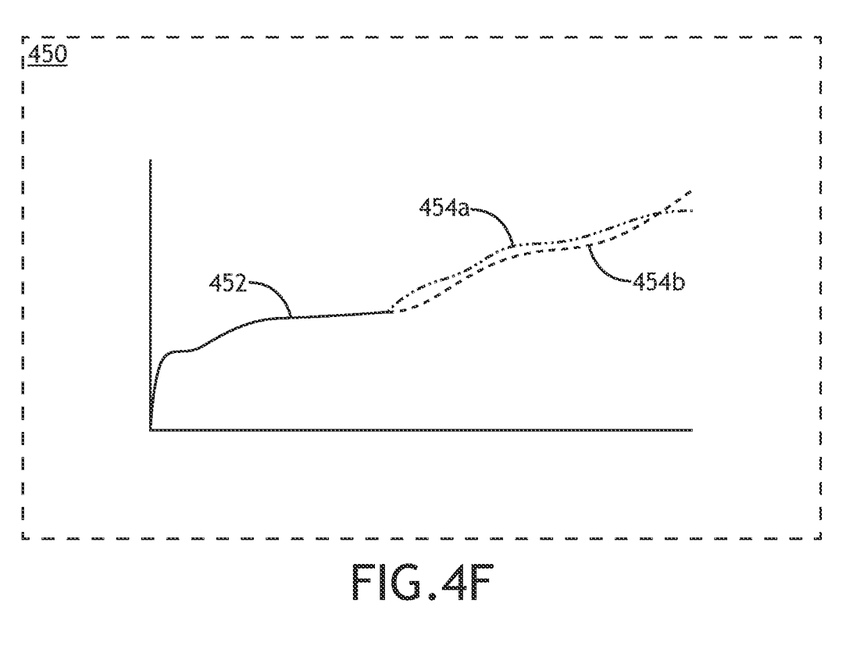

Referring to FIGS. 4D-4F, the display may include a comparison between a current flight route and an alternative flight route. For example, as shown in FIG. 4D, the display 430 may include a bar graph including an alternative flight route carbon savings 432 and a current flight route carbon savings 434. By way of another example, as shown in FIG. 4E, the display 440 may include a bar graph including an alternative flight route carbon savings 442 and a current flight route carbon savings 444. By way of another example, as shown in FIG. 4F, the display 445 may include a plot including a current flight route carbon savings 452 and a plurality of alternative flight route carbon savings 454a-454b. For instance, a first alternate route value 454a may be higher than an additional alternate route value 454b.

Figure 4G:
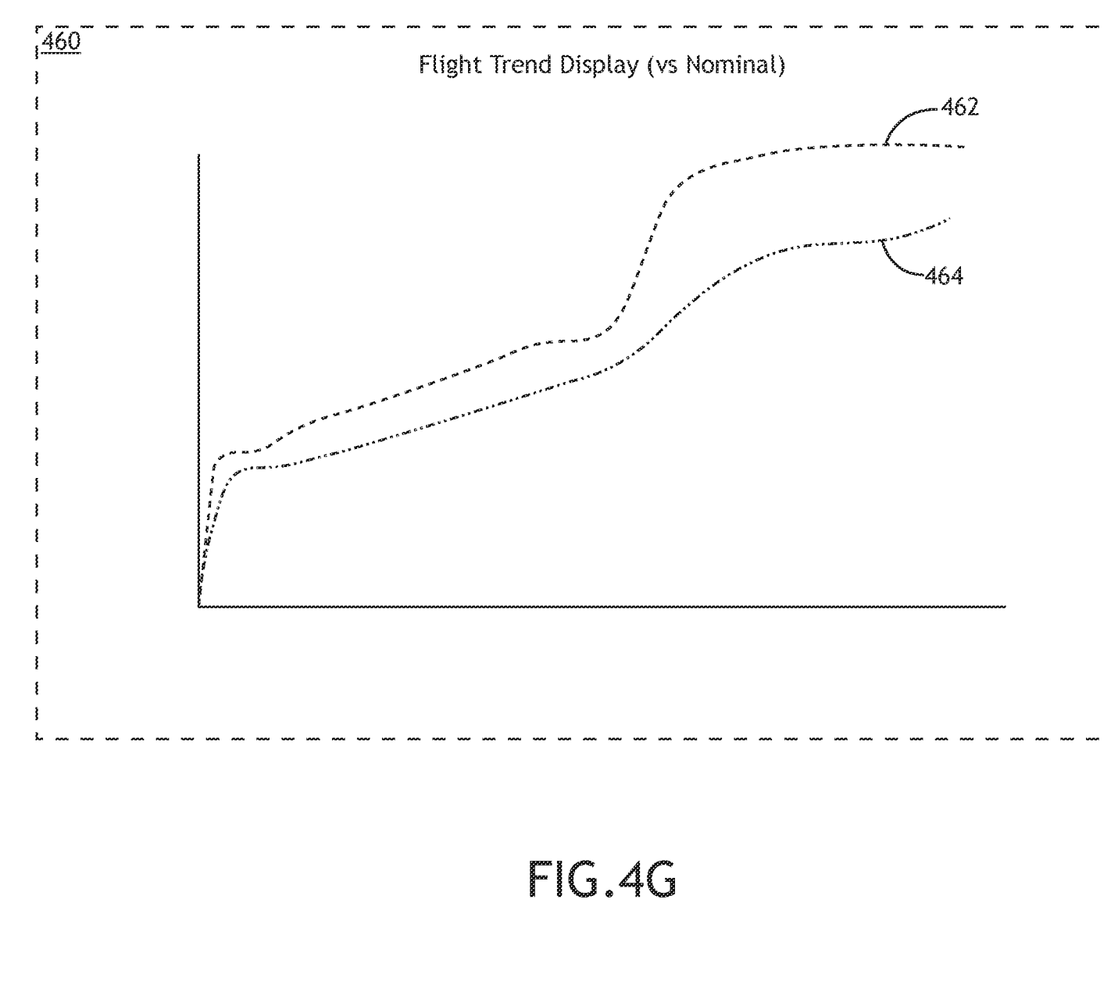

Referring to FIG. 4G, the display 460 may include a flight trend display including a first carbon value 462 associated with a current trend and a second carbon value 464 associated with a nominal trend. For example, nominal data (or historical data) may be retrieved from the database 130.

Figure 4H:
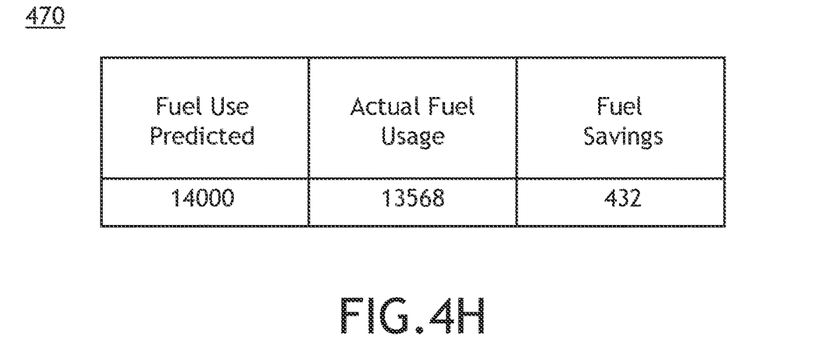

Referring to FIG. 4H, the display 470 may include a table including a fuel use predicted value, an actual fuel usage value, and a fuel savings value.

Figure 4I:
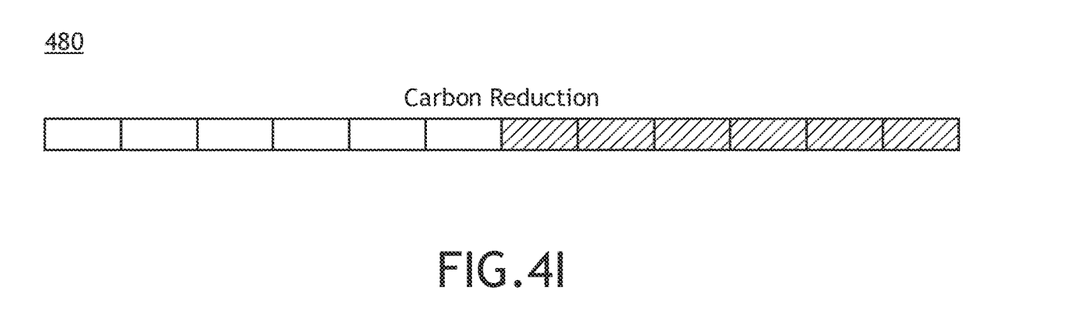

Referring to FIG. 4I, the display 480 may include a horizontal bar graph.

Figure 4J:
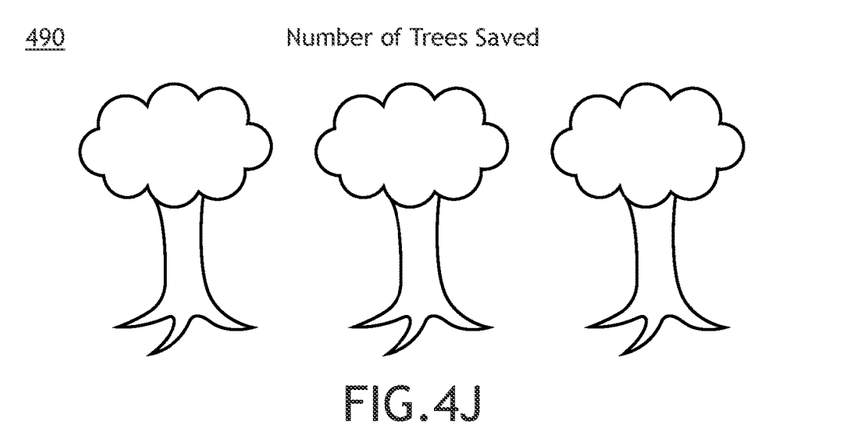

Referring to FIG. 4J, the display 490 may include a number of trees saved (or planted). For example, each tree may correspond to a predetermined amount of carbon dioxide reduction. For instance, as shown in FIG. 4J, the display 490 may indicate how many trees were saved (or planted) based on the calculated carbon savings value (e.g., 3 trees were saved).

It noted herein that FIGS. 4A-4J are provided merely for illustrative purposes and shall not be construed as limiting the scope of the present disclosure. The calculated carbon savings value may be displayed to a user via any graphic, illustration, demonstrative, comparison, or the like. For example, the carbon savings value may be compared to a comparable car trip, legacy aircraft (e.g., 737 classic vs. newer aircraft (e.g., 737 MAX), widebody aircraft vs. narrowbody aircraft, nonstop flight vs. multi-stop flight, and the like.

In an optional step 508, the calculated carbon savings value may be provided to one or more offboard controllers. For example, the one or more on-board controllers 102 may be configured to provide the calculated carbon savings value to one or more offboard controllers. In one instance, the one or more on-board controllers may be configured to provide the calculated carbon savings value to an airline operations center via the communications interface 108 of the controller 102. In this regard, the calculated carbon savings may enable the airline operations center to provide a fleetwide assessment/view of the calculated carbon savings value.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for displaying carbon savings to a user, the system comprising:
    one or more carbon savings input devices, the one or more carbon savings input devices including at least one of a flight management system configured to provide flight management system data, a fuel system configured to provide fuel system data, an air data system configured to provide air data system data, and an engine control system configured to provide engine control system data;
    one or more user interface devices including one or more displays; and
    one or more controllers including one or more processors configured to execute a set of program instructions stored in a memory, the set of program instructions configured to cause the one or more processors to:
        receive one or more carbon savings inputs from the one or more carbon savings input devices;
        receive data from one or more databases, the received data selected from a group including reference data, comparison data, or fuel tabular data;
        calculate a carbon savings value based on the received one or more carbon savings inputs and the received data; and
        generate one or more control signals configured to cause the one or more displays of the one or more user interface devices to display the calculated carbon savings value to the user.

2. The system of claim 1, wherein the one or more user interface devices include one or more flight deck devices.

3. The system of claim 1, wherein the one or more user interface devices include one or more IFE devices.

4. The system of claim 1, wherein the one or more carbon savings input devices further include at least one of:
    the one or more displays of the one or more user interface devices, a flight control system, or an on-board maintenance system.

5. The system of claim 1, wherein the one or more controllers are further configured to:
    provide the calculated carbon savings value to one or more off-board controllers.

6. The system of claim 5, wherein the one or more off-board controllers include one or more airline operator control controllers.

7. The system of claim 1, wherein the flight management system data includes at least one of:
    current flight plan data, alternate flight plan data, or current optimization setting data.

8. The system of claim 1, wherein the fuel system data includes at least one of:
    fuel mix data, fuel temperature data, or fuel consumption rate data.

9. The system of claim 1, wherein the air data system data includes at least one of:
    airspeed, air temperature, or air pressure.

10. The system of claim 1, wherein the engine control system data includes at least one of:
    fuel consumption, engine temperature, engine pressure, or engine speed.

11. The system of claim 3, wherein the user is a passenger, wherein the one or more IFE devices display the calculated carbon savings value to the passenger.

12. The system of claim 1, wherein the fuel tabular data indicates a predetermined carbon footprint associated with a type of avionics fuel.

13. A method for displaying carbon savings to a user, the method comprising:
    receiving one or more carbon savings inputs from one or more carbon savings input devices, the one or more carbon savings input devices including at least one of a flight management system, a fuel system, an air data system, and an engine control system;
    receiving data from one or more databases, the data selected from a group including reference data, comparison data, or fuel tabular data;
    calculating a carbon savings value based on the received one or more carbon savings inputs and the received data; and
    generating one or more control signals configured to cause one or more displays of one or more user interface devices to display the calculated carbon savings value to the user.

14. The method of claim 13, wherein the one or more user interface devices include one or more flight deck devices.

15. The method of claim 13, wherein the one or more user interface devices include one or more IFE devices.

16. The method of claim 13, wherein the one or more carbon savings input devices further include at least one of:
    the one or more displays of the one or more user interface devices, a flight control system, or an on-board maintenance system.

17. The method of claim 13, further comprising:
    providing the calculated carbon savings value to one or more off-board controllers.

18. The method of claim 15, wherein the user is a passenger, wherein the one or more IFE devices display the calculated carbon savings value to the passenger.

19. The method of claim 13, wherein the fuel tabular data indicates a predetermined carbon footprint associated with a type of avionics fuel.

* * * * *